(12) United States Patent
Sullivan et al.

(10) Patent No.: US 12,034,753 B2
(45) Date of Patent: Jul. 9, 2024

(54) SYSTEMS AND METHODS FOR CONTEXT AWARE CYBERSECURITY

(71) Applicant: THE BOEING COMPANY, Chicago, IL (US)

(72) Inventors: Scott Charles Sullivan, South Pasadena, CA (US); Ronald Ward Sackman, Mountain View, CA (US); Ramin Nobakht, Laguna Beach, CA (US)

(73) Assignee: The Boeing Company, Arlington, VA (US)

(*) Notice: Subject to any disclaimer, the term of this patent is extended or adjusted under 35 U.S.C. 154(b) by 183 days.

(21) Appl. No.: 17/536,217

(22) Filed: Nov. 29, 2021

(65) Prior Publication Data

US 2022/0201027 A1    Jun. 23, 2022

Related U.S. Application Data

(60) Provisional application No. 63/127,785, filed on Dec. 18, 2020.

(51) Int. Cl.
*H04L 29/06* (2006.01)
*H04L 9/40* (2022.01)
(Continued)

(52) U.S. Cl.
CPC ...... *H04L 63/1425* (2013.01); *H04L 41/0816* (2013.01); *H04L 41/0886* (2013.01);
(Continued)

(58) Field of Classification Search
CPC ............. H04L 63/1425; H04L 41/0816; H04L 41/0886; H04L 63/1416; H04L 63/145;
(Continued)

(56) References Cited

U.S. PATENT DOCUMENTS 7,530,105 B2    5/2009    Gilbert et al.
7,573,866 B2    8/2009    Nikolova et al.
(Continued)

OTHER PUBLICATIONS

European Search Report and Written Opinion issued in European Patent Application No. 21209797.6 dated Apr. 25, 2022; pp. 1-8.

*Primary Examiner* — Harunur Rashid
(74) *Attorney, Agent, or Firm* — Alleman Hall & Tuttle LLP

(57) ABSTRACT

A system that detects malicious traffic flows in a network includes a computer system including a processor in communication with at least one memory device. The processor is programmed to store a plurality of context information about the network including a plurality of devices. The processor is also programmed to determine a network configuration of the network at a specific point in time. The processor is further programmed to generate one or more security policies for one or more devices of the plurality of devices in the network based on the network configuration and the plurality of context information. In addition, the processor is programmed to deploy the one or more security policies to the one or more devices in the network, wherein the one or more devices are configured to execute an algorithm to monitor communications on the network in view of a corresponding security policy of the one or more security policies.

20 Claims, 10 Drawing Sheets

(51) Int. Cl.
  *H04L 41/08* (2022.01)
  *H04L 41/0816* (2022.01)
(52) U.S. Cl.
  CPC ........ *H04L 63/1416* (2013.01); *H04L 63/145* (2013.01); *H04L 63/20* (2013.01)
(58) Field of Classification Search
  CPC . H04L 63/20; H04L 63/1408; H04L 63/1441; H04L 63/205; H04W 84/06; H04W 12/121; H04W 12/60
  See application file for complete search history.

(56) References Cited

U.S. PATENT DOCUMENTS

| | | | |
|---|---|---|---|
| 9,749,339 B2 | 8/2017 | Kadambe et al. | |
| 10,084,661 B2 | 9/2018 | Zhao et al. | |
| 10,242,202 B1 | 3/2019 | Erickson et al. | |
| 10,771,506 B1* | 9/2020 | Kumar | H04L 63/02 |
| 2005/0193430 A1 | 9/2005 | Cohen | |
| 2005/0229256 A2* | 10/2005 | Banzhof | G06F 21/577 726/25 |
| 2005/0246307 A1 | 11/2005 | Bala | |
| 2007/0067847 A1 | 3/2007 | Wiemer et al. | |
| 2009/0048996 A1 | 2/2009 | Bala | |
| 2009/0077666 A1 | 3/2009 | Chen et al. | |
| 2011/0137833 A1 | 6/2011 | Ide et al. | |
| 2013/0254831 A1* | 9/2013 | Roach | H04W 12/082 726/1 |
| 2014/0280846 A1* | 9/2014 | Gourlay | H04L 63/101 709/223 |
| 2015/0242745 A1 | 8/2015 | Wang et al. | |
| 2015/0244734 A1 | 8/2015 | Olson et al. | |
| 2015/0381660 A1* | 12/2015 | Hsiung | H04L 41/12 726/1 |
| 2016/0191548 A1 | 6/2016 | Smith et al. | |
| 2016/0205122 A1 | 7/2016 | Bassett | |
| 2016/0248795 A1 | 8/2016 | Chien | |
| 2016/0253232 A1 | 9/2016 | Puri et al. | |
| 2016/0269434 A1 | 9/2016 | Divalentin et al. | |
| 2016/0269447 A1 | 9/2016 | Kailash et al. | |
| 2016/0323295 A1 | 11/2016 | Joram et al. | |
| 2016/0359899 A1 | 12/2016 | Zandani | |
| 2016/0366174 A1 | 12/2016 | Chernin et al. | |
| 2016/0378978 A1* | 12/2016 | Singla | H04L 63/1433 726/23 |
| 2017/0098087 A1 | 4/2017 | Li | |
| 2017/0142150 A1 | 5/2017 | Sandke et al. | |
| 2017/0142154 A1 | 5/2017 | Hagar et al. | |
| 2017/0201540 A1 | 7/2017 | Call et al. | |
| 2017/0230389 A1 | 8/2017 | Cochenour | |
| 2017/0353477 A1 | 12/2017 | Faigon et al. | |
| 2018/0262525 A1 | 9/2018 | Yan et al. | |

* cited by examiner

SYSTEMS AND METHODS FOR CONTEXT AWARE CYBERSECURITY

CROSS REFERENCE TO RELATED APPLICATIONS

This application claims the benefit of and priority to U.S. Provisional Application No. 63/127,785, filed Dec. 18, 2020, entitled "SYSTEMS AND METHODS FOR CONTEXT AWARE CYBERSECURITY," which is hereby incorporated by reference in its entirety.

BACKGROUND

The field relates generally to intrusion detection, and more specifically, to detecting malicious traffic flows in a known, controlled, and constantly changing environment.

Communication systems, including communication satellites, are potential targets for malicious actors. Detecting intrusions by these malicious actors can be difficult as monitoring every communication between satellites and other communication systems may not be practical as the configurations and topology of the devices and networks can be constantly changing over time. Accordingly, additional security or systems that improve the detection capabilities of communication systems would be advantageous.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a system that detects malicious traffic flows in a network is provided. The system includes a computer system including at least one processor in communication with at least one memory device. The at least one processor is programmed to store a plurality of context information about the network including a plurality of devices. The at least one processor is also programmed to determine a network configuration of the network at a specific point in time. The at least one processor is further programmed to generate one or more security policies for one or more devices of the plurality of devices in the network based on the network configuration and the plurality of context information. In addition, the at least one processor is programmed to deploy the one or more security policies to the one or more devices in the network. The one or more devices are configured to execute an algorithm to monitor communications on the network in view of a corresponding security policy of the one or more security policies.

In another aspect, a method for detecting malicious traffic flows in a network is provided. The method is implemented by a computer system including at least one processor in communication with at least one memory device. The method includes storing a plurality of context information about the network including a plurality of devices. The method also includes determining a network configuration of the network at a specific point in time. The method further includes generating one or more security policies for one or more devices of the plurality of devices in the network based on the network configuration and the plurality of context information. In addition, the method includes, deploying the one or more security policies to the one or more devices in the network. The one or more devices are configured to execute an algorithm to monitor communications on the network in view of a corresponding security policy of the one or more security policies.

In a further aspect, a system for detecting malicious traffic flows in a network is provided. The system includes a computer system including at least one processor in communication with at least one memory device, wherein the at least one processor is in communication with a plurality of devices in the network. The at least one processor is programmed to store a plurality of security policies, at least one algorithm, and a schedule. The plurality of security policies are based on at least one configuration of the network. The at least one processor is also programmed to determine a security policy of the plurality of security policies and an algorithm of the at least one algorithm to be active based on the schedule and a first point in time. The at least one processor is further programmed to activate the algorithm and the security policy, wherein the security policy configures the algorithm. In addition, the at least one processor is programmed to monitor message traffic on at least one port based on the algorithm and the security policy.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The Figures described below depict various aspects of the systems and methods disclosed therein. It should be understood that each Figure depicts an example of a particular aspect of the disclosed systems and methods, and that each of the Figures is intended to accord with a possible example thereof. Further, wherever possible, the following description refers to the reference numerals included in the following Figures, in which features depicted in multiple Figures are designated with consistent reference numerals.

There are shown in the drawings arrangements, which are presently discussed, it being understood, however, that the present examples are not limited to the precise arrangements and instrumentalities shown, wherein.

DETAILED DESCRIPTION

Figure 1:
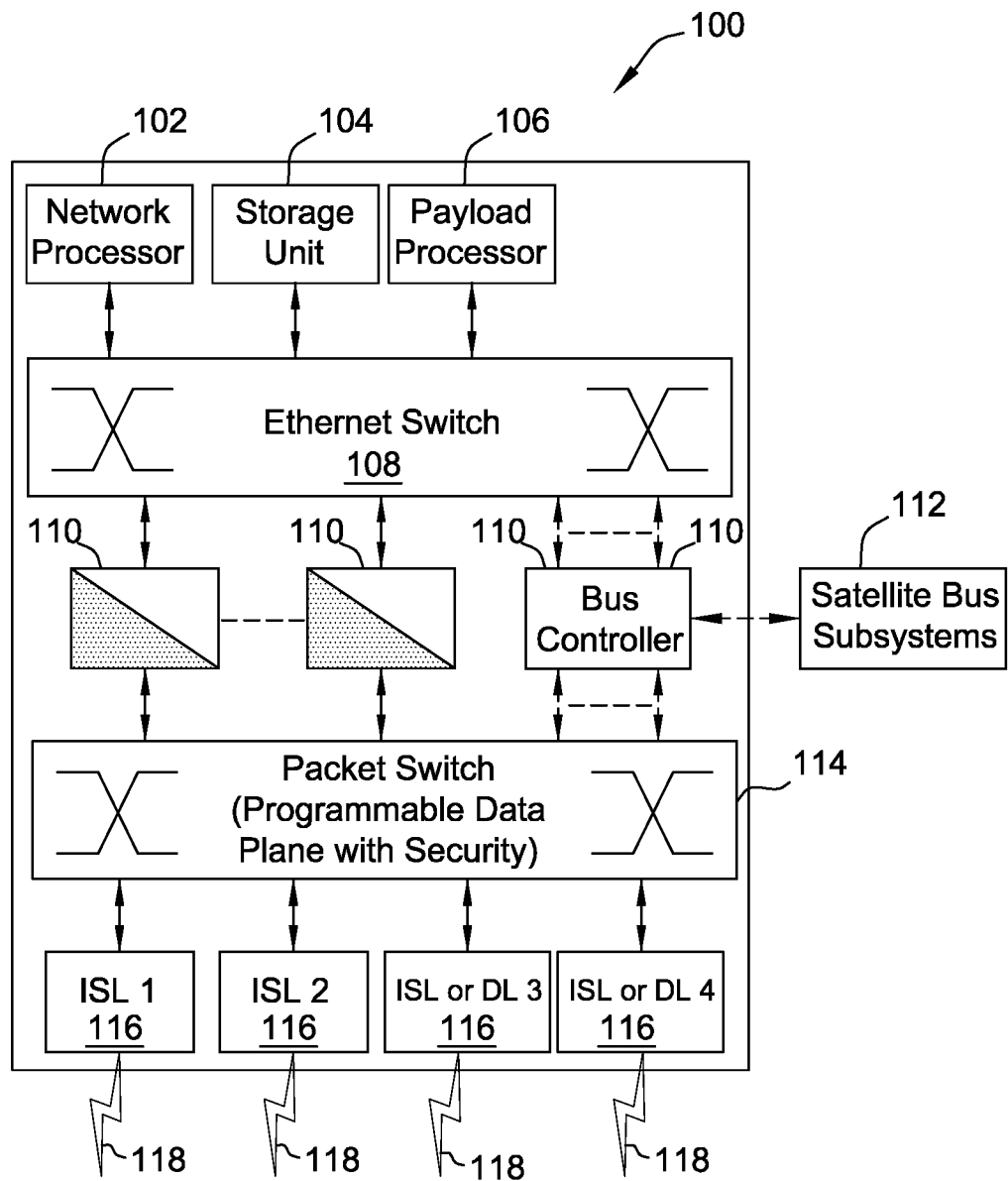
FIG. 1 illustrates a block diagram of an example communication satellite system, in accordance with one example of the present disclosure.

The field relates generally to intrusion detection, and more specifically, to detecting malicious traffic flows in a known, controlled, and constantly changing environment by analyzing the configuration and topology of time-varying networks. In one example, a communication device network analyzer ("CDNA") computer device determines a communication network based on the current time and the available communication devices, and generates and implements one or more policies for the communication devices on the communication network to analyze the communications on the communication network for potential cybersecurity threats.

The disclosed systems and methods include software defined networking (SDN) systems to control and manage one or more security algorithms using available context information about the network, the topology of the network, user information, connection attributes, and/or demand attributes to detect malicious traffic flows. The context information can include the SDN networking architecture for time varying satellite topology. The context information can also include, the full knowledge and control of the satellites in a specific constellation at a specific point in time, including where the satellites are, which satellite is connected to which other device, and which devices should be connected to which other devices at a specific point in time, and for what duration. The context information can further include, but is not limited to, knowing how the users are connected, the types of connections between the satellites and between the satellites and the users, the MOD/COD (modulation and coding, where coding refers to FEC (forward error correction) overhead), data rates, and/or traffic profiles (what kind of traffic users and/or devices are expected to generate).

Example systems and methods determine that for a given topology in time, context information can be used to create and deploy security policies. The context information can be provided, collected, calculated, and/or any collated combination of the above by SDN applications. These SDN applications can include, but are not limited to, a traffic engineering manager, a topology manager, a user manager, etc. Furthermore, for a set of known future topologies, the SDN applications can use the available context information to determine in advance which algorithms to use and to pre-compute one or more security policies for the known future topologies. With the algorithms and security policies in place, the SDN applications can use the algorithms to monitor the data flow information based on the corresponding security policies to monitor for and detect malicious traffic flows.

The CDNA system is configured to obtain and/or store information about the topology, network, and users (i.e., connections, demands, etc.) at a plurality of points in time. For example, the CDNA system can determine what the topology should look like, where the devices are, how the devices are connected, and how the devices should be connected. This especially works in situations where the network devices are controlled by strict schedules, such as satellites. In these situations, the CDNA system would determine where the devices should be and how the devices should be connected based on a schedule. Since the CDNA knows the network and connections, it can determine the best algorithm and security policy for each side of a connection between two communication devices for monitoring that connection.

Example systems and methods recognize that network topology and configuration can change overtime, especially those networks that include mobile communication devices, such as those associated with, but not limited to, satellites, aircraft, watercraft, spacecraft, vehicles, drones, and/or individuals. The systems and methods described herein address the security issues of these changing networks by generating and providing up-to-date security policies for the communication devices based on the current network topology. Updated security policies are also provided for when then network topology changes. By setting the security policies for the communication devices, algorithms, such as those executing on the communication devices, can determine when those security policies are being violated, which may indicate a cybersecurity threat, such as a cyber-intrusion, the presence of malicious code, and/or another threat.

Described herein are computer systems such as the CDNA computer devices and related computer systems. As described herein, such computer systems include a processor and a memory. However, any processor in a computer device referred to herein can also refer to one or more processors wherein the processor can be in one computing device or a plurality of computing devices acting in parallel. Additionally, any memory in a computer device referred to herein can also refer to one or more memories wherein the memories can be in one computing device or a plurality of computing devices acting in parallel.

The systems and processes are not limited to the specific examples described herein. In addition, components of each system and each process can be practiced independent and separate from other components and processes described herein. Each component and process also can be used in combination with other assembly packages and processes.

FIG. 1 illustrates a block diagram of an example communication satellite system 100, in accordance with one example of the present disclosure. The example satellite system 100 includes a network processor 102, a storage unit 104, and a payload processor 106, which are all connected to an Ethernet switch 108. The Ethernet switch 108 is further connected to one or more bus controllers 110, which facilitate communication with satellite bus subsystems 112 and a packet switch 114. In some examples, the packet switch 114 is a programmable data plane with security that allows for the execution of algorithms to monitor a plurality of ports 116 that are used for communication connections 118 from and to the satellite 100. The plurality of ports 116 can include, but are not limited to, inter-satellite links (ISL), down links (DL), and ports 116 that can act as either ISL or DL.

Figure 2:
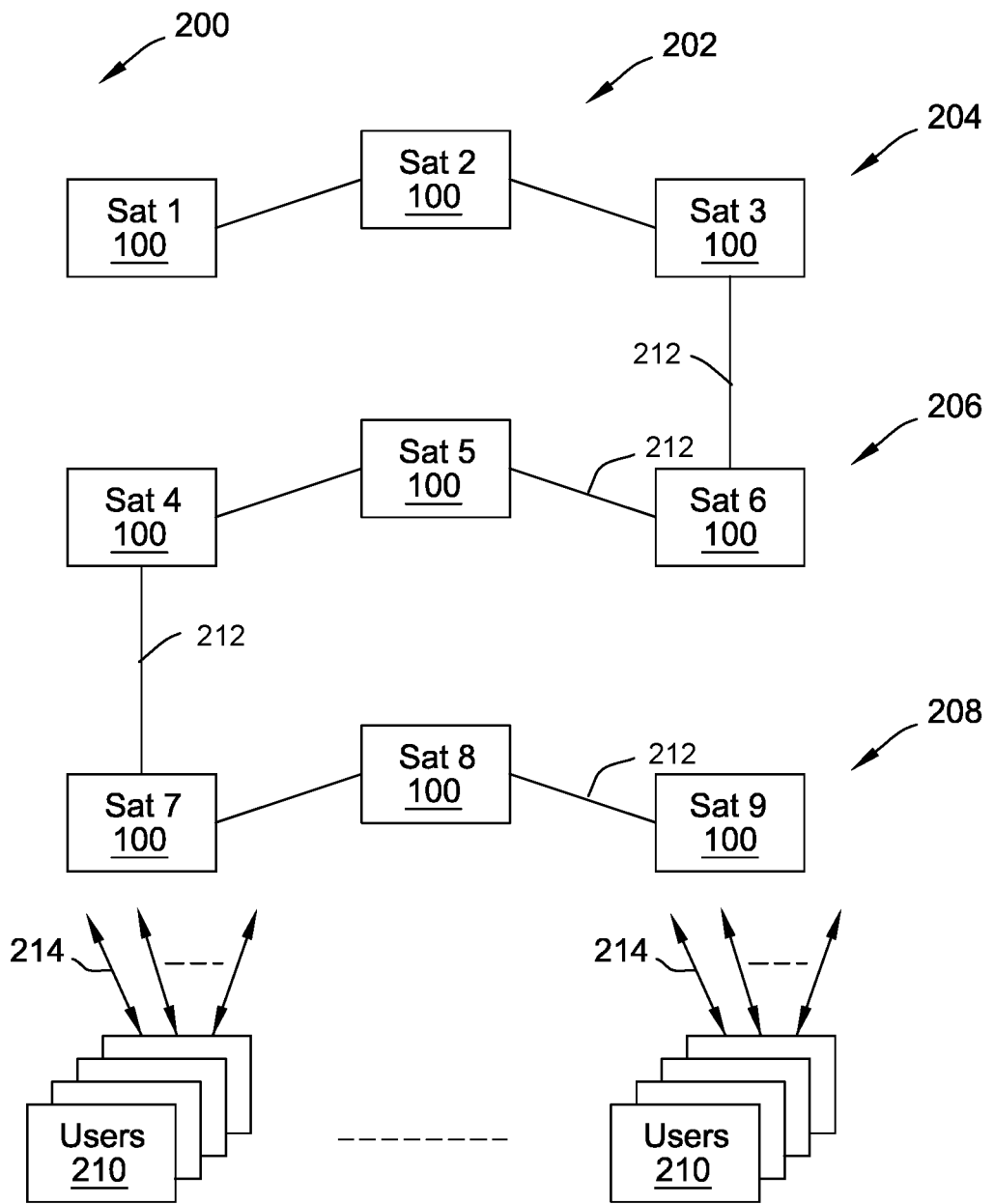
FIG. 2 illustrates a block diagram of an example network in a first network configuration including the example communication satellite system shown in FIG. 1.

FIG. 2 illustrates a block diagram of an example network 200 in a first network configuration 202 including the example communication satellite system 100 (shown in FIG.

1). Network 200 includes a plurality of satellites 100. As shown in the first network configuration 202, the plurality of satellites 100 are at a plurality of orbits, such as geosynchronous earth orbit (GEO) 204, medium earth orbit (MEO) 206, and low earth orbit (LEO) 208. Network 200 can also include satellites 100 in highly elliptical orbit, lunar orbits, or any other non-geostationary (NGSO) orbit around celestial bodies, where their connections and locations are known and/or can be predicted.

Network 200 also includes a plurality of user devices 210. The user devices 210 can include aircraft, spacecraft, watercraft, ground-based vehicles, ground stations, and/or space stations, where the user devices 210 connect to the network 200.

As shown in the first network configuration 202, the satellites 100 each have one or more ISL connections 212. There are also DL connections 214 to the satellites 100 from the user devices 210. While not shown as fully connected in the Figures, each DL connection 214 connects a user device 210 on the network 200 to a satellite 100.

Per the nature of satellites 100, the different satellites 100 orbit the earth at different rates, such that the satellites 100 in the network configuration 202 at time A will be different than that at time B. For example, satellites 100 in LEO 208 will orbit the Earth in 90 to 120 minutes, while those in MEO 206 may take 12 hours to complete an orbit. This means that the satellites 100 that make up the network 200 will change overtime. Accordingly, knowing when the network configuration 202 of the network 200 will change is important to properly securing and monitoring the network 200.

Figure 3:
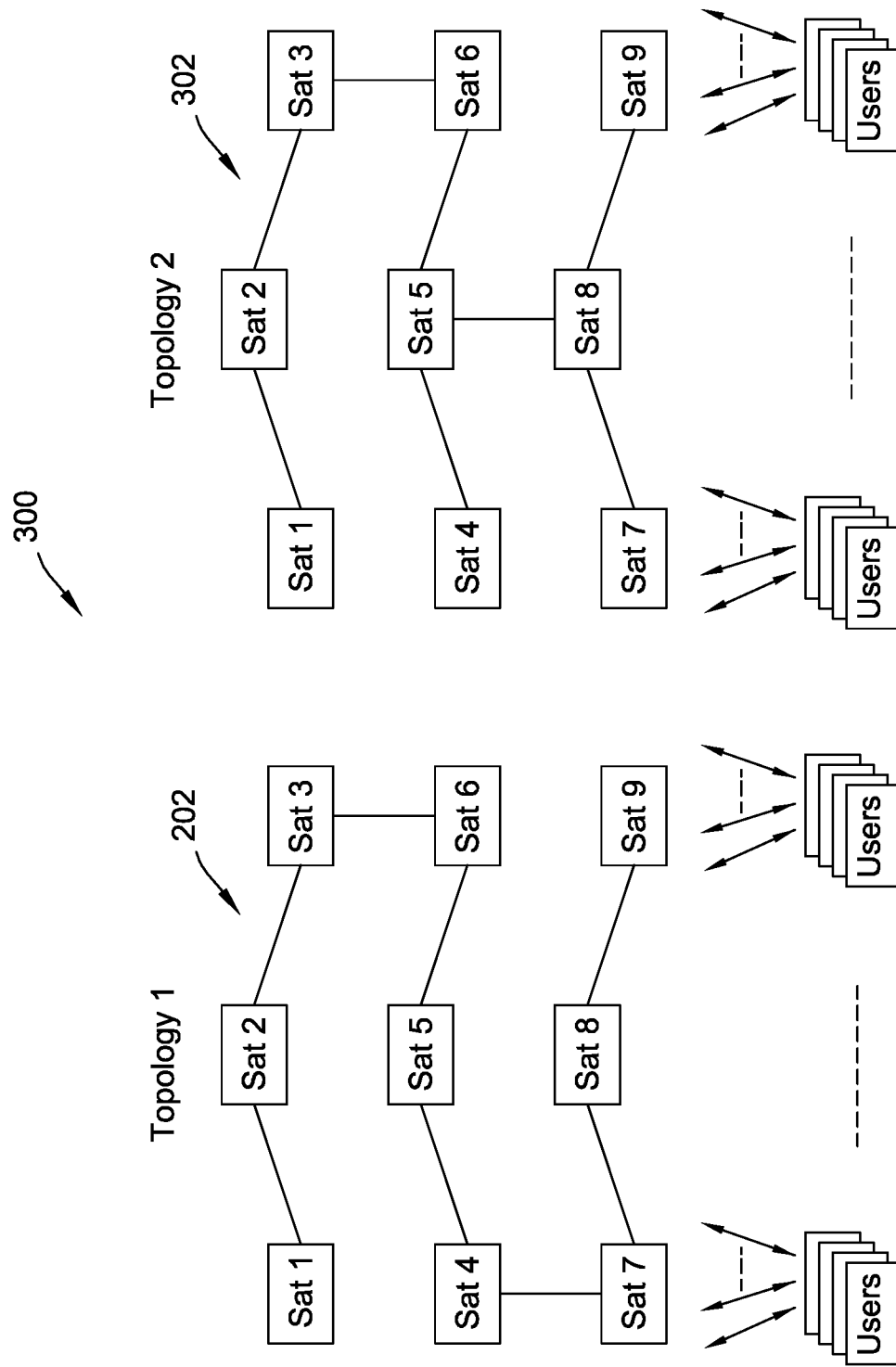
FIG. 3 illustrates a block diagram of a transition from the first network configuration shown in FIG. 2 to a second network configuration.
Figure 4:
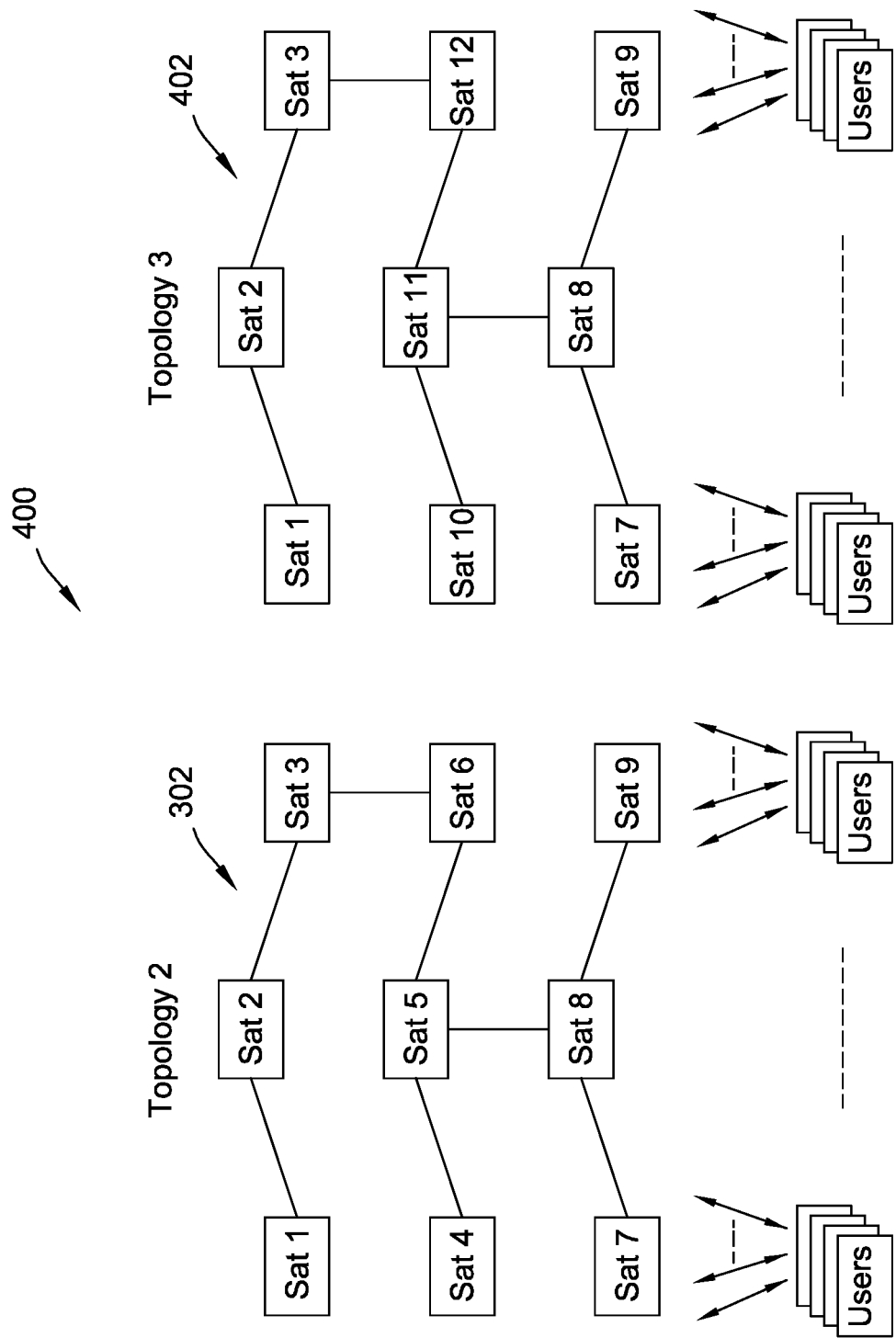
FIG. 4 illustrates a block diagram of a transition from the second network configuration shown in FIG. 3 to a third network configuration.
Figure 5:
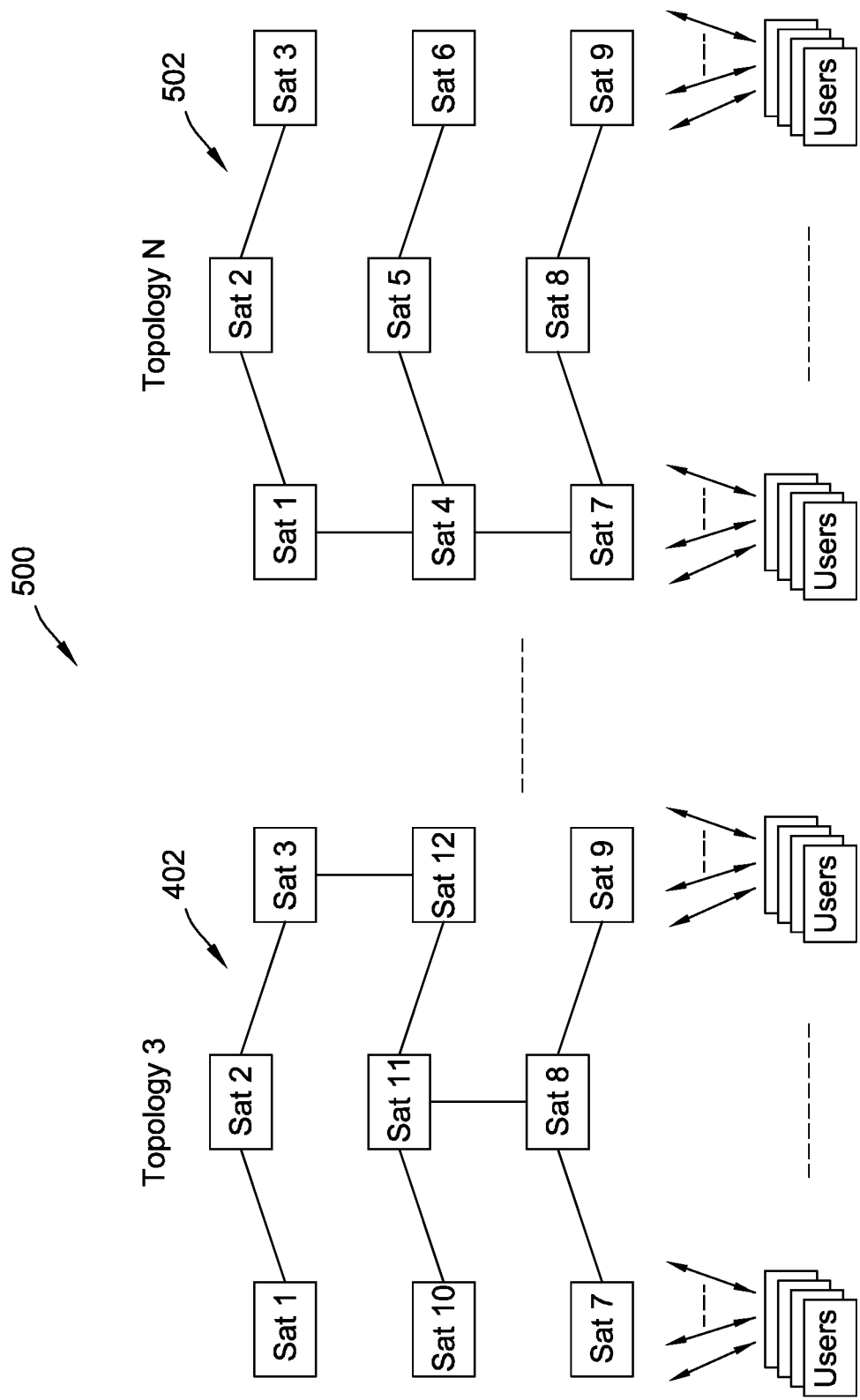
FIG. 5 illustrates a block diagram of a transition from the third network configuration shown in FIG. 4 to an Nth network configuration.

FIGS. 3-6 illustrate the transition of the network 200 from one configuration to another as time changes. FIG. 3 illustrates a block diagram of a transition 300 from the first network configuration 202 to a second network configuration 302. In the transition 300, the ISL connection 212 between satellite #4 and satellite #7 ends and a new ISL connection 212 is created between satellite 5 and satellite 8. FIG. 4 illustrates a block diagram of a transition 400 from the second network configuration 302 to a third network configuration 402. In transition 400, satellites #4, #5, and #6 are replaced by satellites #10, #11, and #12. The ISL connection 212 between satellite #5 and satellite #8 is replaced by an ISL connection 212 between satellite #11 and satellite #8. Furthermore, the ISL connection 212 between satellite #6 and satellite #3 is replaced by an ISL connection 212 between satellite #12 and satellite #3. FIG. 5 illustrates a block diagram of a transition 500 from the third network configuration 402 to an Nth network configuration 502 (e.g., where N is a most any whole number greater than 1). In the third network configuration 402, the ISL connection 212 between the satellites 100 in GEO 204 and MEO 206 is between satellite #1 and satellite #4.

Figure 6:
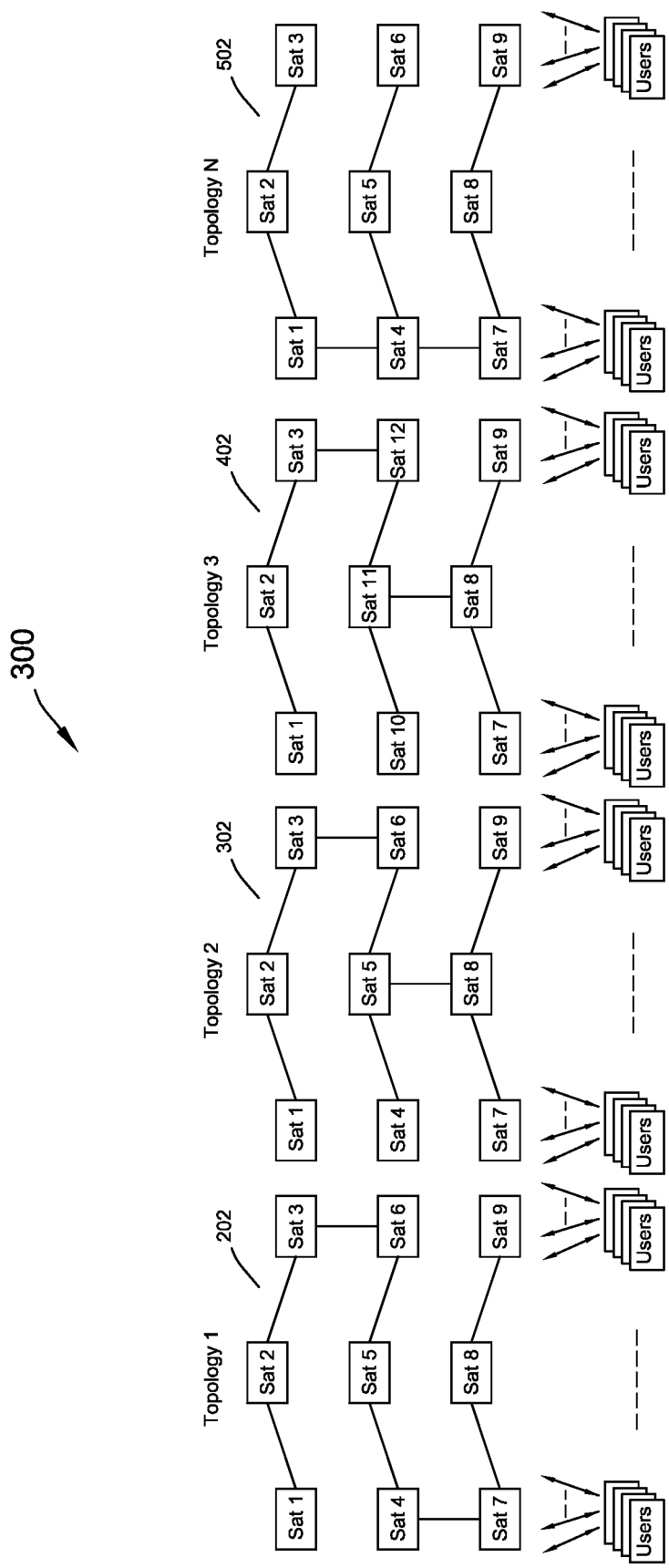
FIG. 6 illustrates a block diagram of the transitions of the network shown in FIG. 2 between the network configurations shown in FIGS. 2, 3, 4, and 5, respectively.

Each network configuration 202, 302, 402, and 502, represents the network 200 at a different point in time. FIG. 6 illustrates a block diagram of the transitions of the network 200 (shown in FIG. 2) between the network configurations 202, 302, 402, and 502 (shown in FIGS. 2, 3, 4, and 5 respectively). While only four network configurations 202, 302, 402, and 502 are shown, there are a plurality of potential different network configurations for network 200. Each different network configuration can include different ISL connections 212 between the satellites 100 and different DL connections 214 between the satellites 100 and the user devices 210 as well as different 100 and 210 on the network 200.

Figure 7:
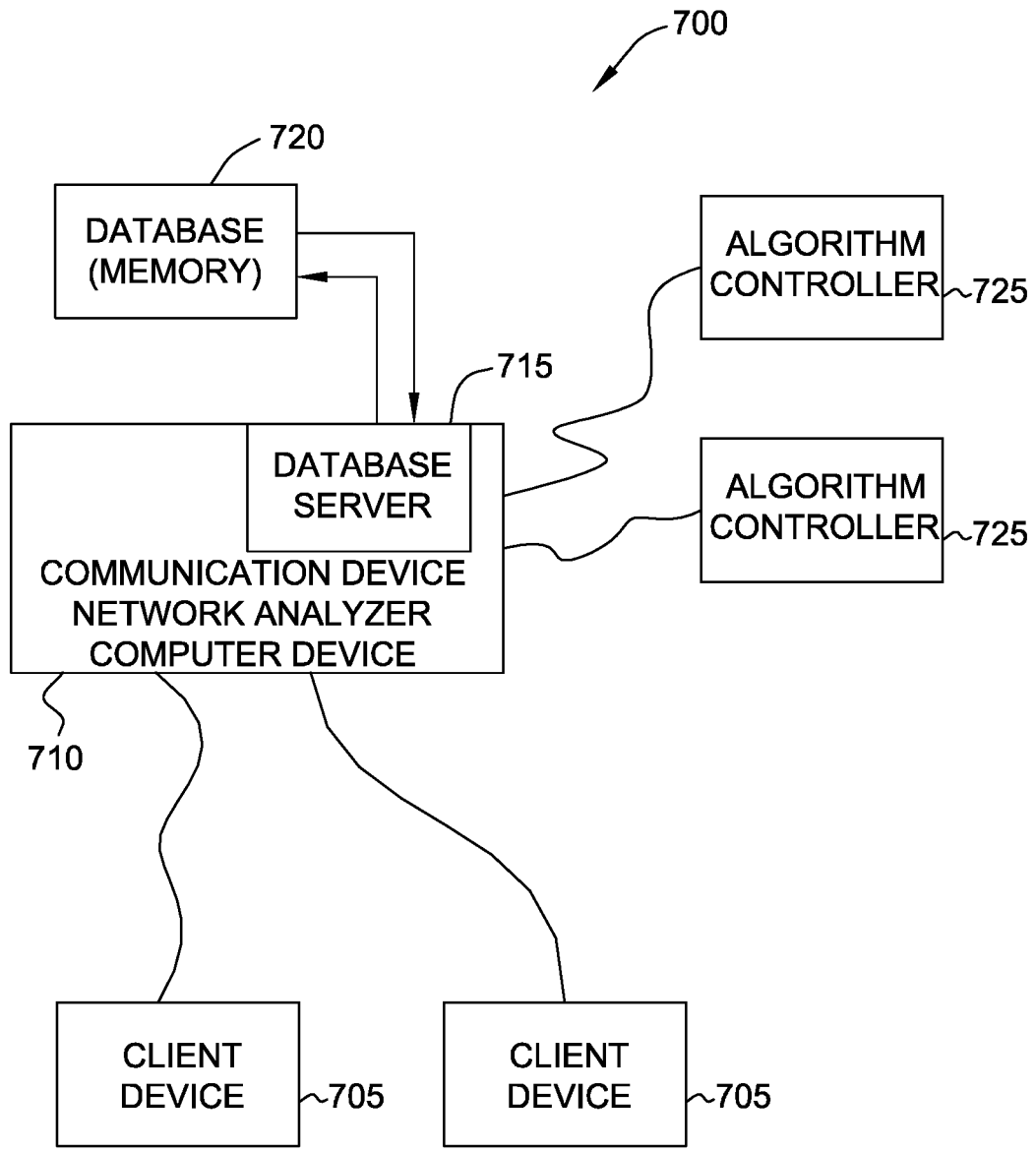
FIG. 7 illustrates a simplified block diagram of an example communication device network analyzer ("CDNA") system for setting the context of the network shown in FIG. 2 in accordance with one example of the present disclosure.

FIG. 7 illustrates a simplified block diagram of an example communication device network analyzer ("CDNA") system 700 for setting the context of the network 200 (shown in FIG. 2) in accordance with one example of the present disclosure. In the example, CDNA system 700, or an SDN application, is used for monitoring the configuration of the network 200 and controlling the operation of algorithms for monitoring the communications of satellites 100 (shown in FIG. 1) and other devices on the network 200. The algorithms monitor the communications on the network 200 for malicious data flows that can indicate cyber-security threats and attacks to allow other systems to potential respond to the identified detected cybersecurity threats and attacks.

The CDNA system 700 includes a plurality of client devices 705 in communication with a communication device network analyzer ("CDNA") computer device 710. The CDNA computer device 710 is in communication with a database server 715 for retrieving and storing data in a database 720. The CDNA computer device 710 is also in communication with a plurality of algorithm controllers 725.

The CDNA computer device 710 is programmed to receive context information about different configuration of the computer network 200. The context information can include, but is not limited to, the knowledge of the satellites 100 (shown in FIG. 1) in the network 200 at a specific point in time, including where the satellites 100 are, which device 100 and 210 is connected to which, and which device 100 and 210 should be connected to which at each specific point in time, and what is the duration of each connection 118. The context information can also include, but is not limited to, how the user devices 210 (shown in FIG. 2) are connected to the network 200 and the satellites 100, the types of connections 118 between the satellites 100 and between the satellites 100 and the user devices 210, the MOD/COD (modulation and coding, where coding refers to FEC (forward error correction) overhead), the data rates, and the traffic profiles (what kind of traffic are users expected to generate) along the network 200 for each network configuration 202, 302, 402, and 502 (shown in FIGS. 2, 3, 4, and 5, respectively). In some examples, the CDNA computer device 710 receives the context information from one or more client devices 705. In other examples, the CDNA computer device 710 receives at least a portion of the context information from the user devices 210 themselves, such as when a user device 210 connects to an ad-hoc network 200. In some examples, all of the connections 212 and 214 (both shown in FIG. 2) are known in advance. In other examples, one or more user devices 210 may be able to connect to the network 200 on an ad-hoc basis. In these examples, the new user device 210 negotiates a connection 118 to the network 200. The new user device's information is passed to the CDNA computer device 710, which generates a new security policy for the new user device 210 and for the devices 100 and 210 that have connections 118 to the new user device 210.

The CDNA computer device 710 uses the context information to determine security policies for each side of each connection 118. In the example, the CDNA computer device 710 generates security policies for each connection 118 on the network 200 that includes a satellite 100. In other examples, the CDNA computer device 710 generates security policies for all connections 118 including those that are between user devices 210 on the network 200. The CDNA computer device 710 also determines which algorithms to use for monitoring each connection 118, where the algorithms are configured to use the security policies to monitor one or more connections 118 for malicious traffic flows. The CDNA computer device 710 activates the appropriate algorithms and the appropriate policies when the network 200 is in the corresponding configuration.

For example, based on network configurations 202, 302, 402, and 502, the CDNA computer device 710 determines that the first network configuration 202 will be valid from Time A to Time B, the second network configuration 302 will be valid from Time B to Time C, the third network configuration 402 will be valid from Time C to Time D, and the fourth network configuration 502 will be valid from Time D to Time E. Furthermore, the CDNA computer device 710 obtains the context information for each network configuration 202, 302, 402, and 502. This context information can be stored in database 720 or received from one or more client devices 705.

For each network configuration 202, 302, 402, and 502, the CDNA computer device 710 determines which algorithm to use monitoring each connection 118 and generates a security policy for each of those connections 118. For example, in the first network configuration 202, the CDNA computer device 710 determines which algorithm to run on satellite #1 for the ISL connection 212 to satellite #2. The CDNA computer device 710 also generates a security policy for that algorithm to use in monitoring the ISL connection 212 to satellite #2. The security policies can include information, such as, but not limited to, when a user is supposed to connect, how long they will connect, the MOD/COD of the connection 118, the data rate of the connection 118, the demand over the connection 118 will be for a defined number of flows, information about those flows, such as packet sizes, how the application is transmitting those packets, arrival times, protocols (if available) and the like. All of that information is compiled on a per connection 118 basis. The CDNA computer device 710 determines which algorithm to run on satellite #2 for the ISL connection 212 and generates a security policy for satellite #2's algorithm to monitor the ISL connection 212. The algorithms and security policies executing on each satellite 100 may be different on different satellites 100 or even different ports 116 of the same satellite 100. The CDNA computer device 710 selects the algorithms and security policies based on one or more attributes of the satellites in question and/or the configuration of the network 200.

The CDNA computer device 710 ensures that the appropriate algorithms and security policies are activated on the corresponding satellites 100 at the correct time. In some examples, the CDNA computer device 710 uploads the security policies and algorithms onto the satellite 100 in advance, along with a schedule of active periods that instructs the satellite 100 when to activate each algorithm and security policy. For example, the CDNA computer device 710 can upload the algorithms and security policies for the first network configuration 202, the second network configuration 302, the third network configuration 402, and the fourth network configuration 502. When Time A begins, then each satellite 100 activates a first predetermined algorithm and security policies associated with the first network configuration 202. When Time B is reached, then each satellite 100 deactivates the first algorithm and security policies, and activates a second predetermined algorithm and security policies associated with the second network configuration 302, and so forth. In these examples, the CDNA computer device 710 can transmit the algorithms and security policies to the satellites well in advance of the beginning of the corresponding network configurations. Furthermore, in some examples, a network configuration can be repeated at multiple points in time. In these examples, each satellite 100 can store a plurality of algorithms and security policies and the CDNA computer device 710 can transmit a signal to the satellite 100 including which algorithm and security policy to activate/deactivate. In other examples, the CDNA computer device 710 transmits one or more of the appropriate algorithms and the security policies at the beginning of a new network configuration. While the above is stated with respect satellites 100, any communication device can be used with the systems and methods describe herein. In some examples, instead of a schedule, each of the security policies includes an active time attribute, and the CDNA computer device 710 activates that security policy at the appropriate time.

In the example, client devices 705 are computers and other SDN applications that have context information about the time-varying network that include a web browser or a software application, which enables client devices 705 to communicate with the CDNA computer device 710 using the Internet, a local area network (LAN), or a wide area network (WAN). In some examples, the client devices 705 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client devices 705 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. In at least one example, one or more client devices 705 include a web browser that can be used to output information to the CDNA computer device 710, such as to provide context information about one or more configurations of the network 200. In some examples, the client devices 705 monitor or control the path of a satellite 100 and provide information about the satellite 100. In other examples, the client devices 705 facilitate communication between the CDNA computer device 710 and one or more satellites 100.

The CDNA computer device 710 includes at least one application executing on the CDNA computer device 710 to perform the network analysis. The application includes information about the satellites 100 and the user devices 210 in the network 200 and is able to determine which algorithms and which security policies to use to with which satellites 100 to monitor the data flows of the computer network 200. The application can be provided as a cloud-based web-service over the Internet or other network.

A database server 715 is communicatively coupled to a database 720 that stores data. In one example, the database 720 includes a plurality of satellite communication attributes, a plurality of attributes of algorithms, a plurality of security policy information, and additional information about user devices 210. In some examples, the database 720 is stored remotely from the CDNA computer device 710. In some examples, the database 720 is decentralized. In the example, a person can access the database 720 via the client device 705 by logging onto CDNA computer device 710.

In the example, algorithm controllers 725 are systems, such as the packet switch 114 (shown in FIG. 1) that can execute algorithms and security policies to monitor communications 118 on ports 116 (both shown in FIG. 1). In the example, the algorithm controllers 725 are in communication with the CDNA computer device 710 to receive signals about which algorithms and security policies to use when. In the example, the algorithm controllers 725 can communicate with the CDNA computer device 710 over ISL connections 212 and DL connections 214. The algorithm controllers 725 can also provide information to the CDNA computer device 710, user devices 210 (shown in FIG. 2), Security Information and Event Management (SIEM) systems, or other client devices 705 about detected potential malicious data flows or other deviations from the security policies. In other examples, the algorithms could be executed in a centralized location, where a computer device at the centralized location monitors communications (i.e., data flows) in the network 200 and reviews those communications in view of the appropriate security policies. Algorithm controllers 725 can be a part of satellites 100 or user devices 210, where connections 118 over ports 116 are available to be monitored.

At a high level, the algorithm is executing on an FPGA or other processor that is a part of the algorithm controllers 725. The algorithm generates data, such as statistical data in the form of logs. The algorithm can be collocated on a satellite 100 or user device 210 and also running on a computer device, such as a client device 705. The computer device then interprets the logs. Based on the review of the algorithm's logs something may be detected. Based on detection, the algorithm controllers 725, the CDNA computer device 710, or other client device can notify an operations center, a security center, or take an action. Actions could include, but are not limited to, providing notifications, alerts, triggering another program, changing the topology of the network, or blocking traffic.

Figure 8:
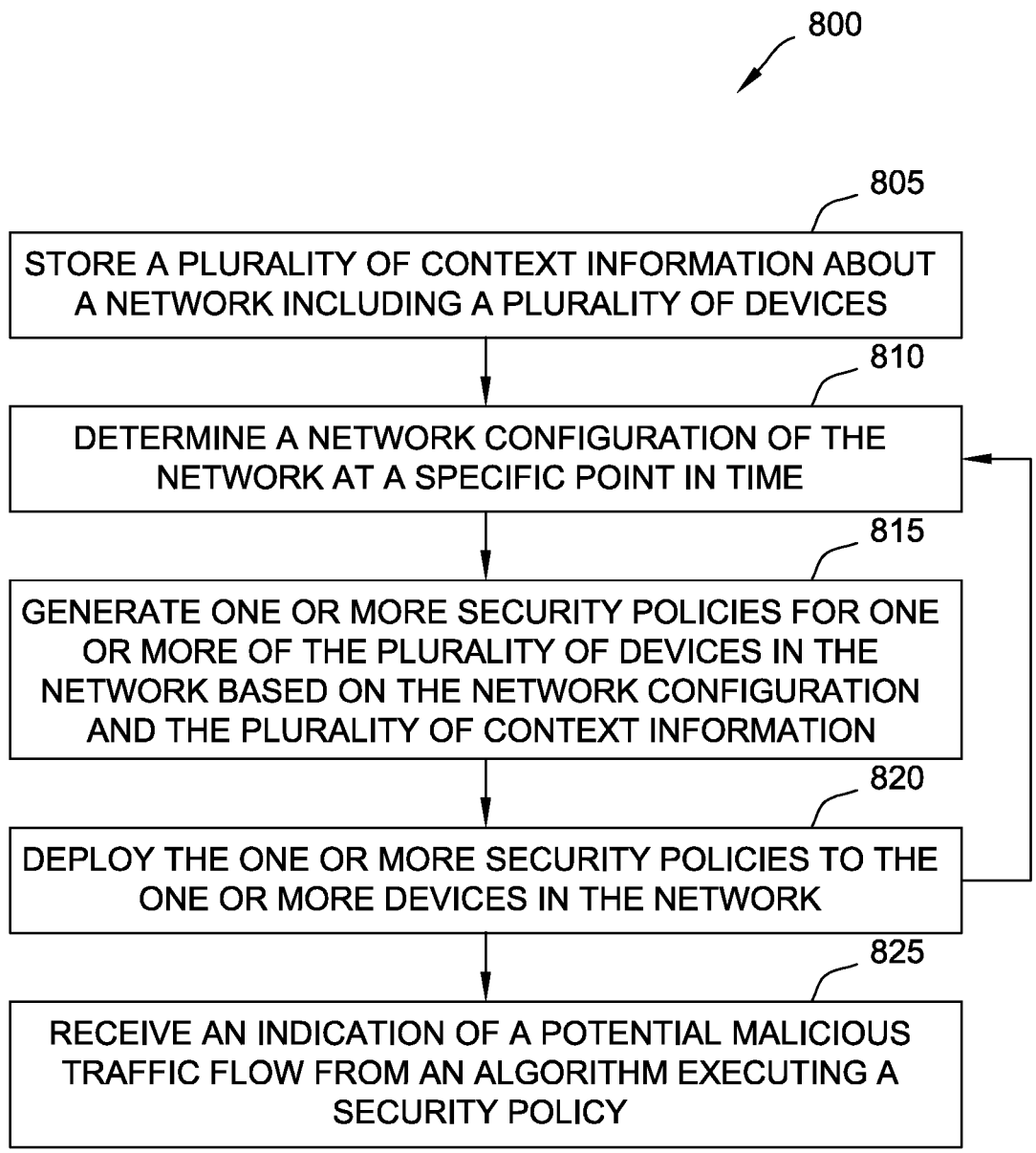
FIG. 8 illustrates an example process for determining the context of the network shown in FIG. 2 and using the system shown in FIG. 7.

FIG. 8 illustrates an example process 800 for determining the context of the network 200 (shown in FIG. 2) and using the system 700 (shown in FIG. 7). The steps of process 800 can be performed by the CDNA computer device 710 (shown in FIG. 7). The CDNA computer device 710 executes one or more applications to perform the steps of process 800. The CDNA computer device 710 is in communication with one or more of the devices in the network 200. The devices in the network can include, but are not limited to, satellites 100 (shown in FIG. 1), user devices 210 (shown in FIG. 2), client devices 705, and algorithm controllers 725 (both shown in FIG. 7).

The CDNA computer device 710 stores 805 a plurality of context information about the network 200 including a plurality of devices 100 and 210. The context information can include, but is not limited to, the knowledge of the satellites 100 in the network 200 at a specific point in time, including where the satellites 100 are, which device 100 and 210 is connected to which, and which device 100 and 210 should be connected to which at each specific point in time, and what is the duration of each connection 118. The context information can also include, but is not limited to, how the user devices 210 are connected to the network 200 and the satellites 100, the types of connections 118 between the satellites 100 and between the satellites 100 and the user devices 210, the MOD/COD (modulation and coding), the data rates, and the traffic profiles along the network 200 for each network configuration 202, 302, 402, and 502 (shown in FIGS. 2, 3, 4, and 5, respectively). In some examples, the CDNA computer device 710 receives the context information from one or more client devices 705. In other examples, the CDNA computer device 710 receives at least a portion of the context information from the user devices 210 themselves, such as when a user device 210 connects to an ad-hoc network 200. In some examples, all of the connections 212 and 214 (both shown in FIG. 2) are known in advance. In other examples, one or more user devices 210 can connect to the network 200 on an ad-hoc basis. In these examples, the new user device 210 negotiates a connection 118 to the network 200. The new user device's information is passed to the CDNA computer device 710, which generates a new security policy for the new user device 210 and for the devices 100 and 210 that have connections 118 to the new user device 210.

The CDNA computer device 710 determines 810 a network configuration 202 of the network 200 at a specific point in time. The network configuration 202 can be any one of network configurations 202, 302, 402, and 502 or a new configuration, such as if a new user device 210 joins the second network configuration 302. In some examples, the CDNA computer device 710 determines 810 the network configuration 202 prior to the specific point in time. In these examples, the CDNA computer device 710 can determine 810 the network configurations for a plurality of points in time based on the store information.

The CDNA computer device 710 generates 815 one or more security policies for one or more of the plurality of devices 100 and 210 in the network 200 based on the network configuration 202 and the plurality of context information. The security policies can include information, such as, but not limited to, when a user is supposed to connect, how long they will connect, the MOD/COD of the connection 118, the data rate of the connection 118, the demand over the connection 118 will be for some number of flows, information about those flows, such as packet sizes, how the application is transmitting those packets, arrival times, protocols (if available). All of that information is compiled on a per connection 118 basis. In some examples, the CDNA computer device 710 generates 815 a security policy for each device of the plurality of devices 100 and 210. In other examples, the CDNA computer device 710 generates 815 a security policy for each side of a connection 118 involving one or more satellites 100. In these examples, the CDNA computer device 710 generates 815 a security policy for each port 116 (shown in FIG. 1) of each satellite 100 that will have a connection 118 in the network configuration 202. In further examples, the CDNA computer device 710 generates 815 a security policy for each port 116 of each device 100 and 210 that will have a connection 118 in the network configuration 202.

In further examples, for the network configuration 202, the CDNA computer device 710 determines which algorithm to use for monitoring each connection 118 and generates a security policy to configure the algorithm for each of those connections 118. For example, in the first network configuration 202, the CDNA computer device 710 determines which algorithm to run on satellite #1 for the ISL connection 212 to satellite 2. The CDNA computer device 710 also generates a security policy for that algorithm to use in monitoring the ISL connection 212 to satellite #2.

The CDNA computer device 710 deploys 820 the one or more security policies to the one or more devices 100 and 210 in the network 200. The one or more devices 100 and 210 are configured to execute an algorithm to monitor communications on the network 200 in view of the corresponding security policy.

The CDNA computer device 710 repeats Steps 810-820 of Process 800 for each network configuration based on the times where the network configuration will be active. As devices 100 and 210 are added and/or removed from the network 200, the network configuration will change and the CDNA computer device 710 will perform process 800 to determine the appropriate security policy and/or algorithm for each device 100 and 210 in the computer network 200 at that point in time.

The CDNA computer device 710 receives 825 an indication of a potential malicious traffic flow from an algorithm executing a security policy. The algorithm controller 725 executes the appropriate algorithm and security policy to monitor communications along its connection 118. If the data on that connection violates the connection 118 in a way that the algorithm judges to be a malicious data flow, then the algorithm controller 725 notifies the CDNA computer device 710, one or more client devices 705, other security monitoring devices, activates a program to respond to the detected malicious data flow, or blocks the connection 118, depending on the configuration of system 700. In some embodiments, the CDNA computer device 710 routes the indication to the appropriate destination, such as, but not limited to a Security Information and Event Management (SIEM) system.

The CDNA computer device 710 determines 810 a first network configuration 202 at a first time. The CDNA computer device 710 generates 815 and deploys 820 the one or more security policies for that first network configuration 202. The CDNA computer device 710 can also determine 810 a second network configuration 302 for the network 200 at a second time. The CDNA computer device 710 generates 815 one or more additional security policies for the one or more devices 100 and 210 in the network 200 based on the second network configuration 302 and the plurality of context information. The CDNA computer device 710 then deploys 820 the one or more additional security policies to the one or more devices 100 and 210 in the network 200. When the topology of the network 200 changes to the second network configuration 302 at the second time, the one or more additional security policies are activated.

The CDNA computer device 710 also determines the algorithm to execute on the device 100 and 210. Each device 100 and 210 can execute multiple different algorithms as different algorithms can be more effective for different connections 118. For example, the algorithm for an ISL connection 212 can be different than a DL connection 214 as the expected communications, types of communications, and make-up of the communications can all be different between the two types of connections. Furthermore, the ISL connections 212 between satellites 100 at the same orbit may require different algorithms than those between different orbits. And the different orbits may also require different algorithms between those in the same orbit. Furthermore, the algorithms to monitor different types of communications may also be different.

The CDNA computer device 710 determines a first algorithm to execute on a first device 100 of the plurality of devices 100 at the specific point in time. The CDNA computer device 710 generates a first security policy for the first algorithm and the first device 100 at the specific point in time. The CDNA computer device 710 deploys the first algorithm and the first security policy to the first device 100. The CDNA computer device 710 determines a second algorithm to execute on the first device 100 at a subsequent point in time. The CDNA computer device 710 generates a second security policy for the second algorithm and the first device 100 at the subsequent point in time. The CDNA computer device 710 deploys the second algorithm and the second security policy to the first device 100. In some examples, the first device 100 stores the first algorithm, the first security policy, the second algorithm, and the second security policy. The CDNA computer device 710 transmits a signal to the first device to execute the first algorithm and the first security policy at the specific point in time. The CDNA computer device 710 transmits another signal to the first device to execute the second algorithm and the second security policy at the subsequent point in time.

In some examples where the device 100 and 210 stores one or more security policies (and one or more algorithms), the CDNA computer device 710 deploys 820 the one or more policies by transmitting each security policy (and algorithm) to the corresponding device 100 and 210 when the security policy (and algorithm) is to be activated. In other examples where the device 100 and 210 stores one or more security policies (and one or more algorithms), the CDNA computer device 710 deploys 820 the one or more policies by transmitting a signal to the corresponding device 100 and 210 when the security policy (and algorithm) is to be activated. In further examples where the device 100 and 210 stores one or more security policies (and one or more algorithms), the CDNA computer device 710 can also transmit a script to the corresponding device 100 and 210. The script comprises the times of when each algorithm and security policy is to be activated. The device 100 and 210 activates the corresponding algorithm and security policy based on the script. For example, the script can include all of the algorithms and security policies to be used during a day, hour, or other period of time, where the CDNA computer device 710 is capable of executing process 800 in advance to set-up the network 200.

In some examples, ad-hoc networks can also be accommodated, where the CDNA computer device 710 receives updated network configuration data for the network 200. The CDNA computer device 710 generates at least one updated security policy based on the updated network configuration data. The CDNA computer device 710 deploys the at least one updated security policy to the appropriate device 100 and 210. For example, the CDNA computer device 710 can determine the algorithms and security policies for a period of time and upload that information the devices 100 and 210. However, a new device can be added to the network 200, or the CDNA computer device 710 learns about a change to one of the devices 100 and 210 in a configuration 202. In these cases, the CDNA computer device 710 can update the network configuration 202 and the corresponding algorithms and security policies.

Figure 9:
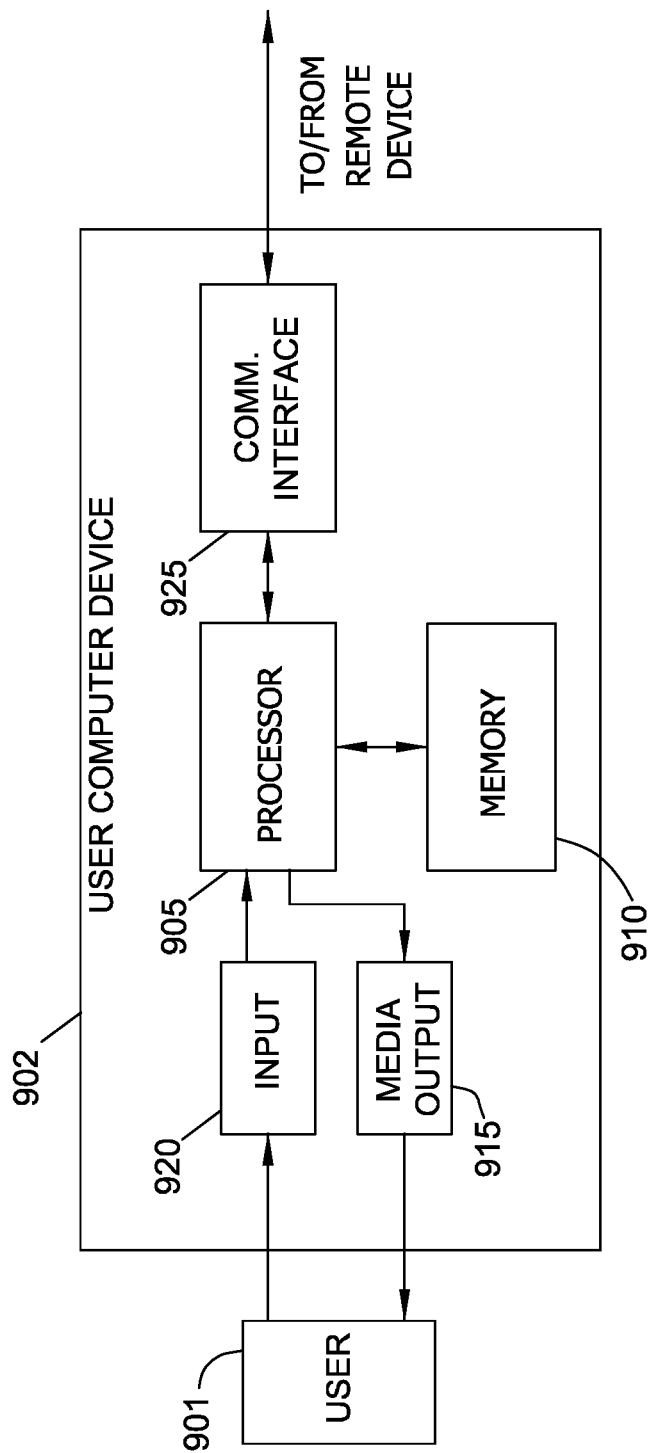
FIG. 9 illustrates an example configuration of a user computer device such as the client device used in the system shown in FIG. 7, in accordance with one example of the present disclosure.

FIG. 9 illustrates an example configuration of a user computer device 902 such as the client device 705 used in the CDNA system 700 (both shown in FIG. 7), in accordance with one example of the present disclosure. User computer device 902 is operated by a user 901. The user computer device 902 can include, but is not limited to, satellites 100 (shown in FIG. 1), user devices 210 (shown in FIG. 2), the client device 705, and the algorithm controller 725 (both shown in FIG. 7). The user computer device 902 includes a processor 905 for executing instructions. In some examples, executable instructions are stored in a memory area 910. The processor 905 can include one or more processing units (e.g., in a multi-core configuration). The memory area 910 is any device allowing information such as executable instructions and/or transaction data to be stored and retrieved. The memory area 910 can include one or more computer-readable media.

The user computer device 902 also includes at least one media output component 915 for presenting information to the user 901. The media output component 915 is any component capable of conveying information to the user 901. In some examples, the media output component 915 includes an output adapter (not shown) such as a video adapter and/or an audio adapter. An output adapter is operatively coupled to the processor 905 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some examples, the media output component 915 is configured to present a graphical user interface (e.g., a web browser and/or a client application) to the user 901. A graphical user interface can include, for example, an interface for viewing the context information about a network 200 (shown in FIG. 2). In some examples, the user computer device 902 includes an input device 920 for receiving input from the user 901. The user 901 can use the input device 920 to, without limitation, input context information or network configuration information. The input device 920 can include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen can function as both an output device of the media output component 915 and the input device 920.

The user computer device 902 can also include a communication interface 925, communicatively coupled to a remote device such as the CDNA computer device 710 (shown in FIG. 7). The communication interface 925 can include, for example, a wired or wireless network adapter and/or a wireless data transceiver for use with a mobile telecommunications network.

Stored in the memory area 910 are, for example, computer-readable instructions for providing a user interface to the user 901 via the media output component 915 and, optionally, receiving and processing input from the input device 920. A user interface can include, among other possibilities, a web browser and/or a client application. Web browsers enable users, such as the user 901, to display and interact with media and other information typically embedded on a web page or a website from the CDNA computer device 710. A client application allows the user 901 to interact with, for example, the CDNA computer device 710. For example, instructions can be stored by a cloud service, and the output of the execution of the instructions sent to the media output component 915.

The processor 905 executes computer-executable instructions for implementing aspects of the disclosure.

Figure 10:
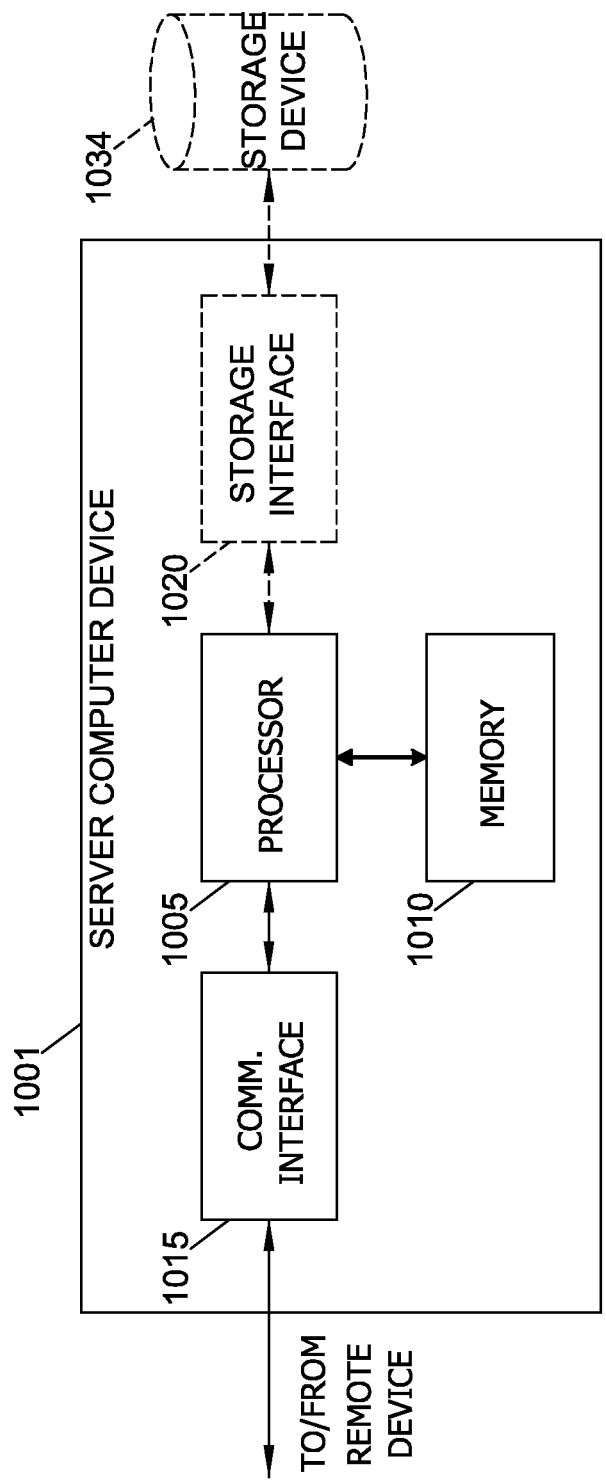
FIG. 10 illustrates an example configuration of a server computer device used in the system shown in FIG. 7, in accordance with one example of the present disclosure.

FIG. 10 illustrates an example configuration of a server computer device 1001 used in the CDNA system 700 (shown in FIG. 7), in accordance with one example of the present disclosure. Server computer device 1001 can include, but is not limited to, the CDNA computer device 710 and the database server 715 (both shown in FIG. 7). The server computer device 1001 also includes a processor 1005 for executing instructions. Instructions can be stored in a memory area 1010. The processor 1005 can include one or more processing units (e.g., in a multi-core configuration).

The processor 1005 is operatively coupled to a communication interface 1015 such that the server computer device 1001 is capable of communicating with a remote device such as another server computer device 1001, another CDNA computer device 710, or the client device 705 (shown in FIG. 7). For example, the communication interface 1015 can receive requests from the client device 705 via the Internet, as illustrated in FIG. 7.

The processor 1005 can also be operatively coupled to a storage device 1034. The storage device 1034 is any computer-operated hardware suitable for storing and/or retrieving data, such as, but not limited to, data associated with the database 720 (shown in FIG. 7). In some examples, the storage device 1034 is integrated in the server computer device 1001. For example, the server computer device 1001 can include one or more hard disk drives as the storage device 1034. In other examples, the storage device 1034 is external to the server computer device 1001 and can be accessed by a plurality of server computer devices 1001. For example, the storage device 1034 can include a storage area network (SAN), a network attached storage (NAS) system, and/or multiple storage units such as hard disks and/or solid state disks in a redundant array of inexpensive disks (RAID) configuration.

In some examples, the processor 1005 is operatively coupled to the storage device 1034 via a storage interface 1020. The storage interface 1020 is any component capable of providing the processor 1005 with access to the storage device 1034. The storage interface 1020 can include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1005 with access to the storage device 1034.

The processor 1005 executes computer-executable instructions for implementing aspects of the disclosure. In some examples, the processor 1005 is transformed into a special purpose microprocessor by executing computer-executable instructions or by otherwise being programmed. For example, the processor 1005 is programmed with instructions such as those shown in FIG. 8.

As used herein, a processor can include any programmable system including systems using micro-controllers; reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "cybersecurity threat" includes an unauthorized attempt to gain access to a subject system. Cybersecurity threats, also known as cyber-attacks or cyber-threats, attempt to breach computer systems by taking advantage of vulnerabilities in the computer systems. Some cybersecurity threats include attempts to damage or disrupt a subject system. These cybersecurity threats can include, but are not limited to, active intrusions, spyware, malware, viruses, and worms. Cybersecurity threats can take many paths (also known as attack paths) to breach a system. These paths can include operating system attacks, misconfiguration attacks, application level attacks, and shrink wrap code attacks. Cybersecurity threats can be introduced by individuals or systems directly accessing a computing device, remotely via a communications network or connected system, or through an associated supply chain.

As used herein, the term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Washington). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, CA). In yet a further example, the system is run on a Mac OS® environment (Mac OS is a registered trademark of Apple Inc. located in Cupertino, CA). In still yet a further example, the system is run on Android® OS (Android is a registered trademark of Google, Inc. of Mountain View, CA). In another example, the system is run on Linux® OS (Linux is a registered trademark of Linus Torvalds of Boston, MA). The application is flexible and designed to run in various different environments without compromising any major functionality.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The patent claims at the end of this document are not intended to be construed under 35 U.S.C. § 112(f) unless traditional means-plus-function language is expressly recited, such as "means for" or "step for" language being expressly recited in the claim(s).

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The methods and system described herein may be implemented using computer programming or engineering techniques including computer software, firmware, hardware, or any combination or subset. As disclosed above, at least one technical problem with prior systems is that there is a need for systems for monitoring communication networks, where the networks change over time. The system and methods described herein address that technical problem. Additionally, at least one of the technical solutions to the technical problems provided by this system can include: (i) improved accuracy in monitoring communications over the network, (ii) reduced chance of false positive based on included context information for analysis; (iii) inclusion of all applicable data in communication performance analysis; (iv) up-to-date analysis of communication performance; and (v) accurate integration of information about all of the devices on the network.

The methods and systems described herein can be implemented using computer programming or engineering techniques including computer software, firmware, hardware, or any combination or subset thereof, wherein the technical effects can be achieved by performing at least one of the following steps: a) store a plurality of context information about the network including a plurality of devices, wherein the one or more devices of the plurality of devices are satellites, wherein each device of the plurality of devices is configured to execute an algorithm and a security policy for each connected port of the device; b) determine a network configuration of the network at a specific point in time, wherein the specific point in time is a first specific time, wherein the network configuration is a first network configuration; c) generate one or more security policies for one or more devices of the plurality of devices in the network based on the network configuration and the plurality of context information; d) deploy the one or more security policies to the one or more devices in the network, wherein the one or more devices are configured to execute an algorithm to monitor communications on the network in view of a corresponding security policy of the one or more security policies; e) receive an indication of a potential malicious traffic flow from the algorithm; f) determine a second network configuration for the network at a second specific time; g) generate one or more additional security policies for the one or more devices in the network based on the second network configuration and the plurality of context information; h) deploy the one or more additional security policies to the one or more devices in the network, wherein a topology of the network changes at the second specific time; i) determine a first algorithm to execute on a first device of the plurality of devices at the specific point in time; j) generate a first security policy for the first algorithm and the first device at the specific point in time; k) deploy the first algorithm and the first security policy to the first device; l) transmit a signal to the first device to execute the first algorithm and the first security policy, m) determine a second algorithm to execute on the first device at a subsequent point in time; n) generate a second security policy for the second algorithm and the first device at the subsequent point in time; o) deploy the second algorithm and the second security policy to the first device; p) receive updated network configuration data for the network; q) generate at least one updated security policy based on the updated network configuration data; r) deploy the at least one updated security policy; s) transmit each security policy to the corresponding device when the security policy is to be activated; t) deploy the one or more policies the at least one processor is further programmed to transmit a signal to the corresponding device when the security policy is to be activated, wherein each device of the plurality of devices stores the one or more security policies; and u) transmit a schedule to the corresponding device, wherein the schedule comprises activation time periods during which each security policy is to be activated, wherein each device of the plurality of devices stores the one or more security policies, and wherein the device is configured to activate the corresponding security policy based on the schedule.

In some further embodiments, the technical effects can also be achieved by performing at least one of the following steps: a) store a plurality of security policies, at least one algorithm, and a schedule, wherein the plurality of security policies are based on at least one configuration of the network; b) determine a security policy of the plurality of security policies and an algorithm of the at least one algorithm to be active based on the schedule and a first point in time; c) activate the algorithm and the security policy, wherein the security policy configures the algorithm; and d) monitor message traffic on at least one port based on the algorithm and the security policy; e) determine a second security policy of the plurality of security policies to be active based on the schedule and a second point in time, wherein the algorithm is a first algorithm and the security policy is a first security policy; f) activate the first algorithm and the second security policy, wherein the second security policy configures the first algorithm; and g) monitor message traffic on at least one port based on the first algorithm and the second security policy.

The computer-implemented methods discussed herein can include additional, less, or alternate actions, including those discussed elsewhere herein. The methods can be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein can include additional, less, or alternate functionality, including that discussed elsewhere herein. The computer systems discussed herein can include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein can be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system that detects malicious traffic flows in a network comprising a computer system including at least one processor in communication with at least one memory device, wherein the at least one processor is programmed to:
    store a plurality of context information about the network, wherein the network includes a plurality of devices in a plurality of network configurations at a plurality of points in time including a first plurality of devices in a first network configuration at a first point in time and a second plurality of devices in a second network configuration at a second point in time, wherein in the first plurality of devices is different from the second plurality of devices by at least one device;
    generate one or more security policies for the first plurality of devices of the plurality of devices in the network based on the first network configuration and the plurality of context information;
    generate one or more additional security policies for the second plurality of devices of the plurality of devices in the network based on the second network configuration and the plurality of context information;
    determine that a current point in time corresponds to the first point in time and deploy the one or more security policies to the first plurality of devices in the network based on the first network configuration, wherein the first plurality of devices are configured to execute an algorithm to monitor communications on the network in view of a corresponding security policy of the one or more security policies, and wherein each device of the first plurality of devices is configured to execute the algorithm and the corresponding security policy for each connected port of the device; and
    determine that the current point in time corresponds to the second point in time and deploy the one or more additional security policies to the second plurality of devices in the network based on the second network configuration.

2. The system of claim 1, wherein the at least one processor is further programmed to receive an indication of a potential malicious traffic flow from the algorithm.

3. The system of claim 1, wherein a topology of the network changes at the second time.

4. The system of claim 1, wherein the at least one processor is further programmed to:
    determine a first algorithm to execute on a first device of the plurality of devices at a specific point in time;
    generate a first security policy for the first algorithm and the first device at the specific point in time; and
    deploy the first algorithm and the first security policy to the first device.

5. The system of claim 4, wherein the at least one processor is further programmed to transmit a signal to the first device to execute the first algorithm and the first security policy.

6. The system of claim 4, wherein the at least one processor is further programmed to:
    determine a second algorithm to execute on the first device at a subsequent point in time;
    generate a second security policy for the second algorithm and the first device at the subsequent point in time; and deploy the second algorithm and the second security policy to the first device.

7. The system of claim 1, wherein the one or more devices of the plurality of devices are satellites.

8. The system of claim 1, wherein the at least one processor is further programmed to:
receive updated network configuration data for the network;
generate at least one updated security policy based on the updated network configuration data; and
deploy the at least one updated security policy.

9. The system of claim 1, wherein to deploy the one or more security policies the at least one processor is further programmed to transmit each security policy to a corresponding device of the plurality of devices when the security policy is to be activated.

10. The system of claim 1, wherein each device of the plurality of devices stores at least one security policy, and wherein to deploy the at least one security policy the at least one processor is further programmed to transmit a signal to a corresponding device of the plurality of devices when a security policy of the at least one security policy is to be activated.

11. The system of claim 1, wherein each device of the first plurality of devices stores the one or more security policies, and wherein to deploy the one or more security policies the at least one processor is further programmed to transmit a schedule to a corresponding device, wherein the schedule comprises activation time periods during which each security policy is to be activated, and wherein each device is configured to activate the one or more security policies based on the schedule.

12. A method for detecting malicious traffic flows in a network, the method implemented by a computer system including at least one processor in communication with at least one memory device, wherein the method comprises:
storing a plurality of context information about the network, wherein the network includes a plurality of devices in a plurality of network configurations at a plurality of points in time including a first plurality of devices in a first network configuration at a first point in time and a second plurality of devices in a second network configuration at a second point in time, wherein in the first plurality of devices is different from the second plurality of devices by at least one device;
generating one or more security policies for the first plurality of devices of the plurality of devices in the network based on the first network configuration and the plurality of context information;
generating one or more additional security policies for the second plurality of devices of the plurality of devices in the network based on the second network configuration and the plurality of context information;
determining that a current point in time corresponds to the first point in time and deploying the one or more security policies to the first plurality of devices in the network based on the first network configuration, wherein the first plurality of devices are configured to execute an algorithm to monitor communications on the network in view of a corresponding security policy of the one or more security policies, and wherein each device of the first plurality of devices is configured to execute the algorithm and the corresponding security policy for each connected port of the device; and
determining that the current point in time corresponds to the second point in time and deploy the one or more additional security policies to the second plurality of devices in the network based on the second network configuration.

13. The method of claim 12 further comprising receiving an indication of a potential malicious traffic flow from the algorithm.

14. The method of claim 12 further comprising:
determining a first algorithm to execute on a first device of the plurality of devices at a specific point in time;
generating a first security policy for the first algorithm and the first device at the specific point in time; and
deploying the first algorithm and the first security policy to the first device.

15. The method of claim 14 further comprising transmitting a signal to the first device to execute the first algorithm and the first security policy.

16. The method of claim 14 further comprising:
determining a second algorithm to execute on the first device at a subsequent point in time;
generating a second security policy for the second algorithm and the first device at the subsequent point in time; and
deploying the second algorithm and the second security policy to the first device.

17. The method of claim 12 further comprising:
receiving updated network configuration data for the network;
generating at least one updated security policy based on the updated network configuration data; and
deploying the at least one updated security policy.

18. The method of claim 12, wherein to deploy the one or more security policies the method further comprises transmitting each security policy to a corresponding device of the plurality of devices when the security policy is to be activated.

19. The method of claim 12, wherein each device of the plurality of devices stores at least one security policy, and wherein to deploy the at least one security policy the method further comprises transmitting a signal to a corresponding device of the plurality of devices when a security policy of the at least one security policy is to be activated.

20. The method of claim 12, wherein each device of the first plurality of devices stores the one or more security policies, and wherein to deploy the one or more security policies the method further comprises transmitting a schedule to a corresponding device, wherein the schedule comprises activation time periods during which each security policy is to be activated, and wherein each device is configured to activate the one or more security policies based on the schedule.

* * * * *